United States Patent [19]

Jordan et al.

[11] Patent Number: 5,435,433
[45] Date of Patent: Jul. 25, 1995

[54] DUAL BELT CONVEYOR WITH PRODUCT ISOLATION

[75] Inventors: Larry G. Jordan, Irving; Mark S. Boswell, Grand Prairie; Gerry R. Dollinger, DeSoto, all of Tex.

[73] Assignee: Project Services Group, Inc., Dallas, Tex.

[21] Appl. No.: 212,703

[22] Filed: Mar. 14, 1994

[51] Int. Cl.⁶ ............................................. B65G 15/14
[52] U.S. Cl. ............................. 198/626.5; 198/626.3
[58] Field of Search ................. 198/604, 607, 626.1, 198/626.2, 626.3, 626.5, 690.2, 698, 699.1, 861.1

[56] References Cited

U.S. PATENT DOCUMENTS

| | | |
|---|---|---|
| 2,713,412 | 7/1955 | Douglass . |
| 2,916,137 | 12/1959 | Hume .............................. 198/626.5 |
| 3,063,362 | 11/1962 | Guettler . |
| 4,000,808 | 1/1977 | Pradon ............................ 198/572 |
| 5,186,310 | 2/1993 | Winchester .................... 198/626.5 |

FOREIGN PATENT DOCUMENTS

| | | | |
|---|---|---|---|
| 0149206 | 7/1985 | European Pat. Off. | ......... 198/626.5 |
| 1204135 | 10/1965 | Germany | ......................... 198/626.5 |
| 0059112 | 4/1983 | Japan | ............................... 198/626.2 |
| 1-162616 | 6/1989 | Japan . | |

*Primary Examiner*—James R. Bidwell
*Attorney, Agent, or Firm*—Dennis T. Griggs

[57] ABSTRACT

Primary and secondary conveyor belts have portions aligned in mutually parallel relation. At least one of the conveyor belts includes flites and sideguards projecting toward a surface of the other conveyor belt for defining between confronting portions of the conveyor belts a plurality of chambers for enclosing the product to be conveyed. The flites and pluralities of side guards project substantially perpendicularly relative to each other, whereby the chambers formed thereby are of substantially rectangular configuration, interpositioned between successive flites. The side guards of a primary conveyor are interdigitated between the flites and other side guards projecting outwardly from the other conveyor belt, for minimizing any leakage of particulate material from the chambers.

13 Claims, 8 Drawing Sheets

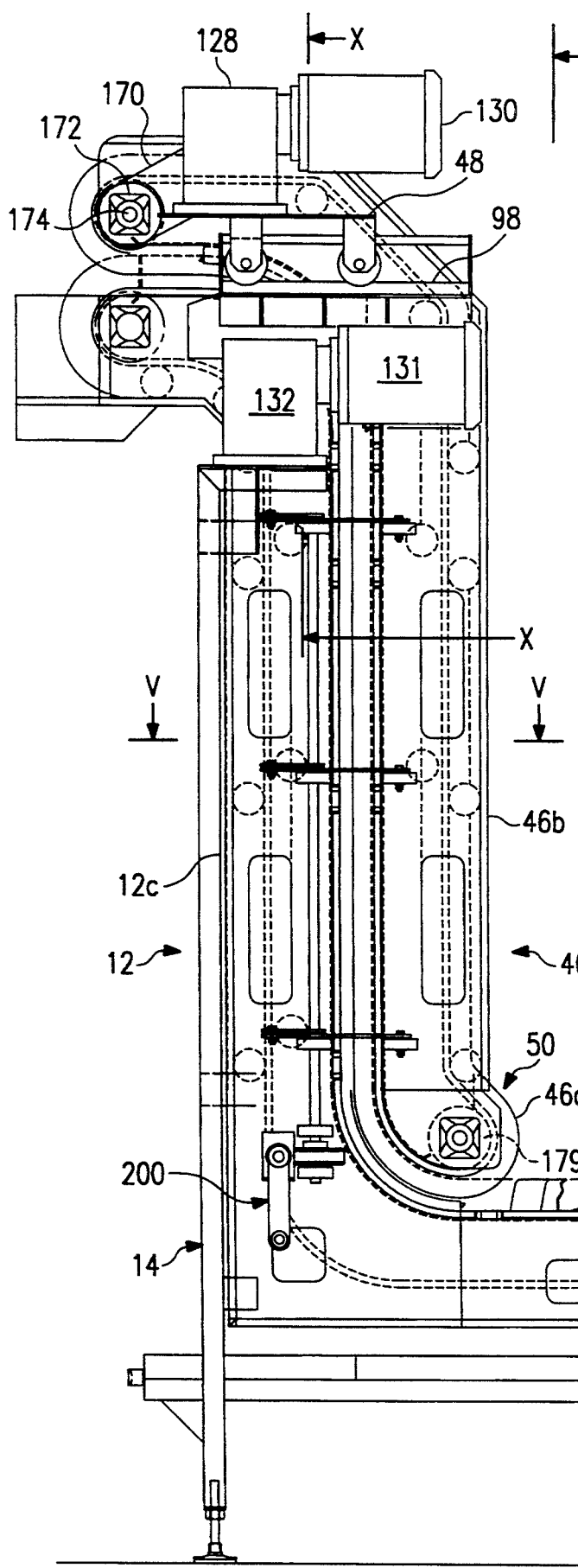
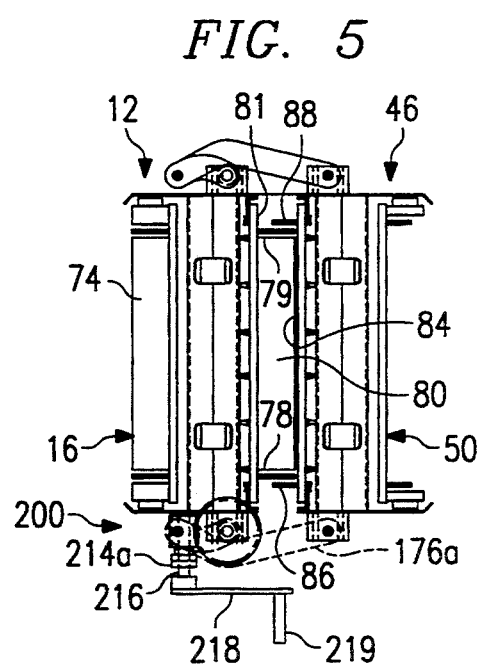
FIG. 4
FIG. 5

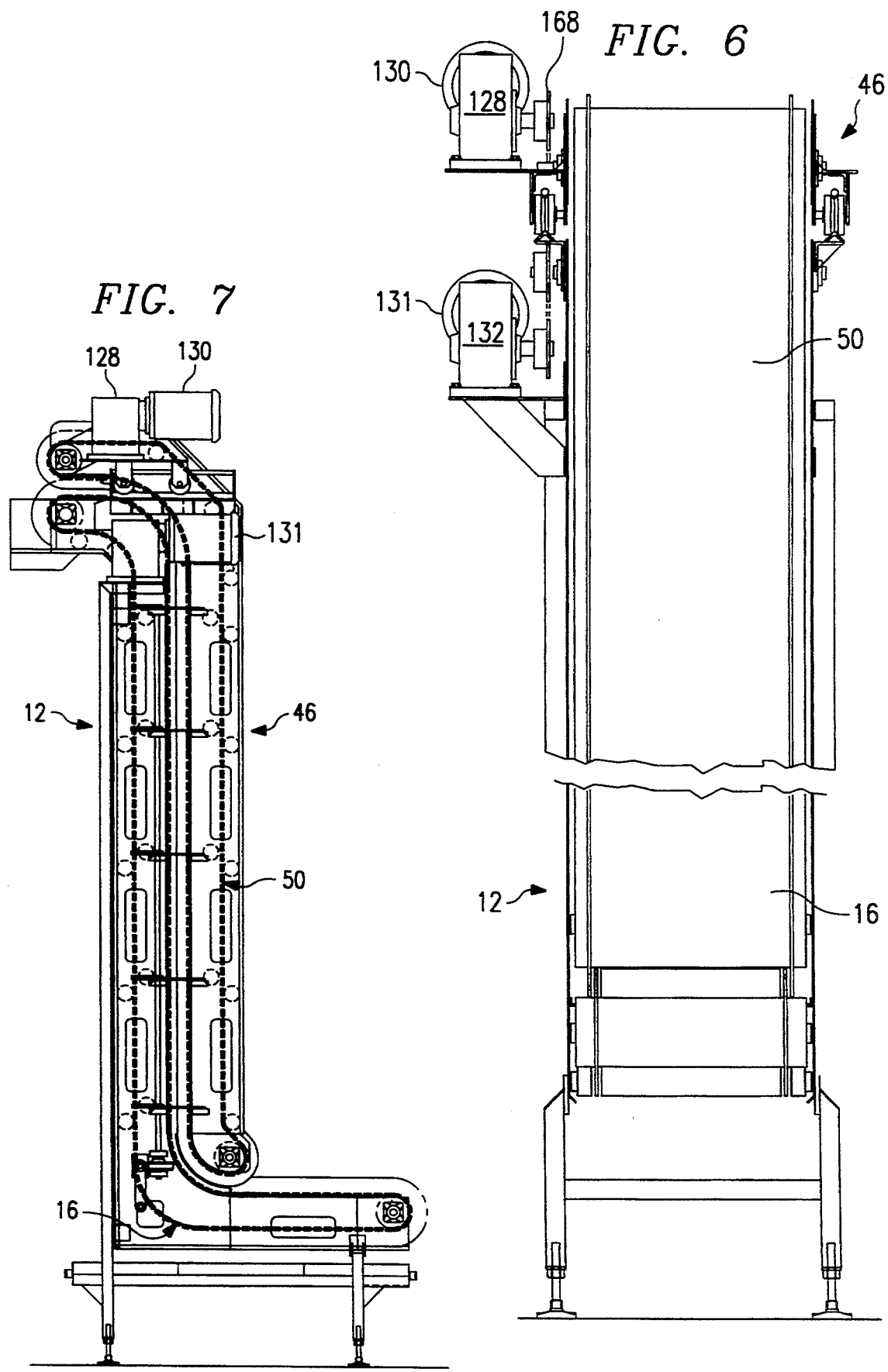

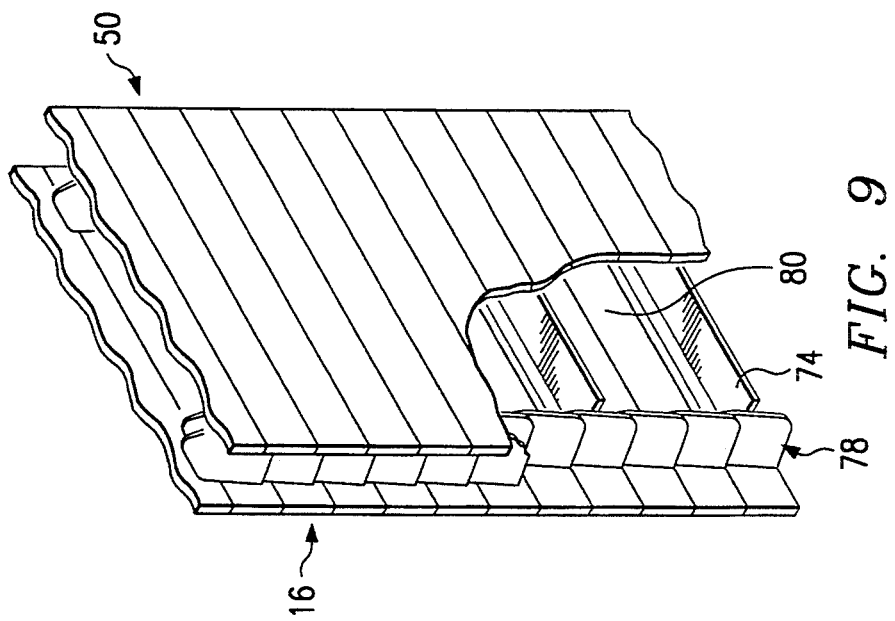
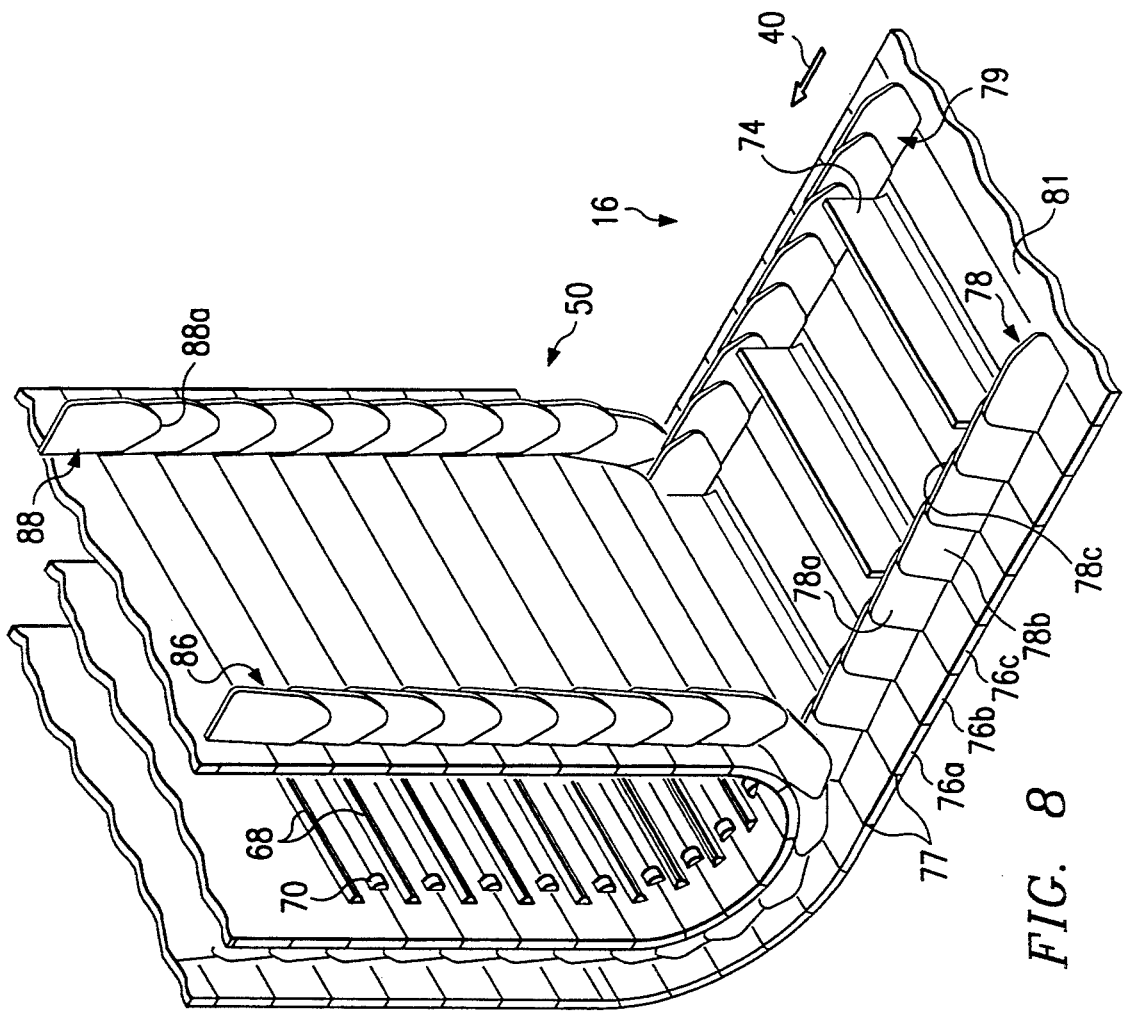

DUAL BELT CONVEYOR WITH PRODUCT ISOLATION

TECHNICAL FIELD OF THE INVENTION

This invention relates in general to conveyor systems and, more particularly, to a conveyor system, having first and second mutually confronting conveyor belts, adapted for conveying food products, particulate materials, viscous liquids, and the like.

BACKGROUND OF THE INVENTION

Dual endless belt conveyor systems have been used in industrial applications in which it is desired to transport products or materials as they are supported between confronting portions of the belts. Such dual belt systems may be constructed in the form of vertical lift conveyors, in which confronting portions of the conveyor belts have vertical extension and in which a product may be carried from a first to a second, higher elevation for processing, packaging, or the like. Particularly in the case of conveyor systems to be utilized for conveying food products, certain standards and regulations often apply with respect to the prevention of contamination of the product. For example, the belts are normally required to be cleaned and inspected at regular intervals.

When a conveyor apparatus is to be used in the handling of fragile components, deformable products, viscous or plastic substances, or the like, consideration must be given to minimizing product loss or damage as the product is carried between adjacent conveyor belts. In the conveying of viscous or particulate materials, it is also desirable that seepage or leakage of the materials from between mutually confronting portions of the conveyor belts is minimized. In many applications, it is also important that the conveyor be of high efficiency, whereby large volumes of material may be conveyed per unit of time.

DESCRIPTION OF THE PRIOR ART

In the past, vertical lift conveyor belts have incorporated buckets, concave flites, cleats, or the like for supporting and carrying products along a vertical or an upwardly sloped path. In the conveying of particulate materials, such buckets open forwardly in the direction of travel, whereby they are effective to scoop up the particulate material and support it, so long as the belt follows a generally upward path. Such conveyor belts have generally not been appropriate for applications in which spillage of the product is of concern, as in the conveying of fine, particulate material, or in which sanitation is a concern, as in the handling of food products and the like. In applications in which the material to be conveyed must be protected from damage or contamination, dual belt systems have thus been utilized, in which laterally extending flites or cleats are formed on one of the belts, and side guard strips are fixedly mounted alongside the belts for capturing the food product in the space defined between the dual, mutually confronting belts. Such fixed side guards, which may comprise strips of metal affixed to the frame of the conveyor apparatus, extend along either side of at least one of the dual belts and may in some applications serve to guide the belts as well as to channel and reduce spillage of the product. The use of such fixed side guards entails certain disadvantages for many applications, however. If, for example, the product is flexible or viscous, it may tend to creep or flow laterally from between the belts, whereby it may come into contact with the side guards and possibly damage the product and/or the conveyor mechanism. Certain products tend to accumulate on surfaces of the side guards or other fixed components, and possibly retard or jam the belts. In the conveying of food products, wherein both sanitation and prevention of damage to the product are of concern, should the product accumulate on a non-moveable side guard or other component, contamination of the product may result. It is thus preferable, with respect both to sanitational and operational considerations, that the products be captured between the dual belts and isolated from contact with fixed elements of the conveyor apparatus. In the past, however, if fixed side guards were omitted, the products tended to flow or seep out of the space defined between the mutually confronting conveyor belts. There is thus a need for a dual belt conveyor system adapted to capture a product between confronting portions of the belts without the use of fixed side guards or the like, and whereby spillage and contamination of the product are prevented or minimized.

A major concern with respect to conveyor systems for handling food products is that the surfaces of the belts which contact the product must be maintained under sanitary conditions and may not be contaminated by dirt or food products which collect on the surfaces. For these reasons, it is preferable that the conveyor belts are formed of rigid, non-porous materials and have smooth surfaces which may be readily and effectively cleaned, and on which food products do not tend to collect. For example, such conveyor belts may be formed advantageously of plastic materials such as polyurethane, polyethylene, and various other polymers. The endless belts then comprise a plurality of mutually interconnected links, having hinged connections to permit conformance of the belts with the desired path of movement. Such smooth polymer materials are readily cleaned, and food products do not tend to permeate or adhere to the surfaces of the belt components as in the case of belts formed of fibrous or porous materials.

Prescribed sanitation standards often entail regular routines of cleaning and disinfecting. In certain applications, for example, government agencies may require that the belts be thoroughly cleaned on a prescribed schedule, e.g., after every hour of operation. In the case of conveyors having dual, mutually confronting belts, it will be appreciated that thorough cleaning and inspection of the mutually confronting portions of the belts can be difficult, since confronting portions of the belts are not readily accessible. That is, the mutually confronting portions of the conveyor belts overlap one another, and their confronting surfaces are "hidden" and difficult to access. In one conveyor system, this problem is addressed by pivotally interconnecting the two conveyors whereby respective upper end portions thereof are mutually pivotable about a common, horizontal axis. One of the conveyors is thus free to swing outwardly relative to the other conveyor to permit access to portions of the mutually confronting surfaces for inspection and cleaning. One disadvantage of this construction is that the interconnected, upper portions of the two conveyors, adjacent the pivotal connection, remain in close proximity as the lower portion of the movable conveyor is pivoted outwardly, thereby restricting access to the upper portions. Accordingly, it is difficult to inspect and thoroughly clean the adjacent, upper portions of the conveyors and conveyor belts, and difficult to gain access to the upper, confronting portions of the conveyors for maintenance and the like.

OBJECTS OF THE INVENTION

It is, accordingly, a major object of the present invention to provide a new and improved, dual belt conveyor system.

Another object is to provide such a conveyor system which is adapted for use in the conveying of food products and the like for applications wherein stringent requirements exist with respect to sanitation and the prevention of spoilage.

A further object is to provide such a conveyor system which is adapted for efficiently conveying particulate material.

A further object is to provide such a conveyor system in which fixed side guards, extending alongside the conveyor belts for capturing or channeling the product are not required, thereby minimizing the potential for accumulation of food products or the like on the side guards and other fixed portions of the conveyors.

A still further object is to provide such a conveyor system in which mating portions of the conveyor belts define a plurality of chambers between mutually confronting surfaces of the belts for capturing and protecting the product and for preventing spillage thereof.

Yet another object is to provide such a conveyor system in which the configuration and alignment of the chambers defined between the two conveyor belts are such that a substantial portion of the volume defined between confronting portions of the two belts lies within the chambers themselves, whereby large volumes of product per unit of conveyor length may be accommodated, thereby enhancing the output of the system.

A further, major object of the invention is to provide a new and improved conveyor system in which two conveyors, having respective mutually parallel conveyor portions, may be laterally separated while remaining in substantially parallel alignment, to permit convenient access to the mutually confronting portions of the conveyors for facilitating cleaning and servicing thereof.

Yet another object is to provide such a conveyor system in which mutually confronting portions of dual conveyors and conveyor belts may be separated by laterally translating one of the conveyors away from the other along an axis substantially perpendicular to its longitudinal axis, whereby convenient access to the entire length of the confronting portions is afforded.

A still further object of the invention is to provide such a dual conveyor system in which separate, individual drive systems are provided for each conveyor, minimizing slippage and stress on the two conveyor belts, and providing independant control of the respective independent drive systems.

A still further object is to provide such a conveyor system which is of a commercially efficient and practicable design, utilizing commercially available components and capable of operation for extended periods with relatively little maintenance.

Other objects and advantages of the invention will become apparent from the specification and accompanying claims and from the accompanying drawings.

SUMMARY OF THE INVENTION

In accordance with one preferred embodiment of the invention, a primary conveyor having a plurality of transversely extending, outwardly projecting flites is provided in alignment with a secondary conveyor, and means are provided for relatively translating the primary and secondary conveyors between a first orientation in which a substantially linear portion of the secondary conveyor and a confronting portion of the primary conveyor are in adjacent, parallel alignment, whereby a product or material may be captured and conveyed in the space defined between the two conveyors, and a second orientation in which the confronting portion of the secondary conveyor is spaced from the confronting portion of the primary conveyor, permitting convenient access to the two conveyors for cleaning and servicing. In a preferred embodiment, laterally extending flites and longitudinally extending rows of side guards are formed on the primary conveyor belt and adapted to be closely aligned with portions of the secondary conveyor belt for defining between the two conveyor belts a series of chambers. In the preferred embodiment, the chambers are of substantially rectangular configuration.

BRIEF DESCRIPTION OF THE DRAWINGS

For a more complete understanding of the invention, reference should be made to the accompanying drawings, wherein:

FIG. 4 is a side elevational view, similar to FIG. 1, in which the secondary conveyor is positioned in its operable position, in confronting relationship with the primary conveyor, with portions of the primary conveyor belt broken away for clarity;

FIG. 5 is a cross-sectional view of the conveyor system taken as on line V—V of FIG. 4;

FIG. 6 is a front elevation of the conveyor system, taken as on line VI—VI of FIG. 4;

FIG. 7 is a schematic, sectional view, similar to FIG. 4, with portions of the structure of the conveyors omitted for clarity;

FIG. 8 is a schematic, perspective representation of portions of the two conveyor belts, as positioned when the conveyors are in the mutually adjacent orientation of FIGS. 1-3, and with associated structure of the conveyors removed for clarity;

FIG. 9 is a schematic, fragmentary, perspective view showing portions of the articulated conveyor belt structures;

DETAILED DESCRIPTION OF THE PREFERRED EMBODIMENTS

Figures 1, 2:
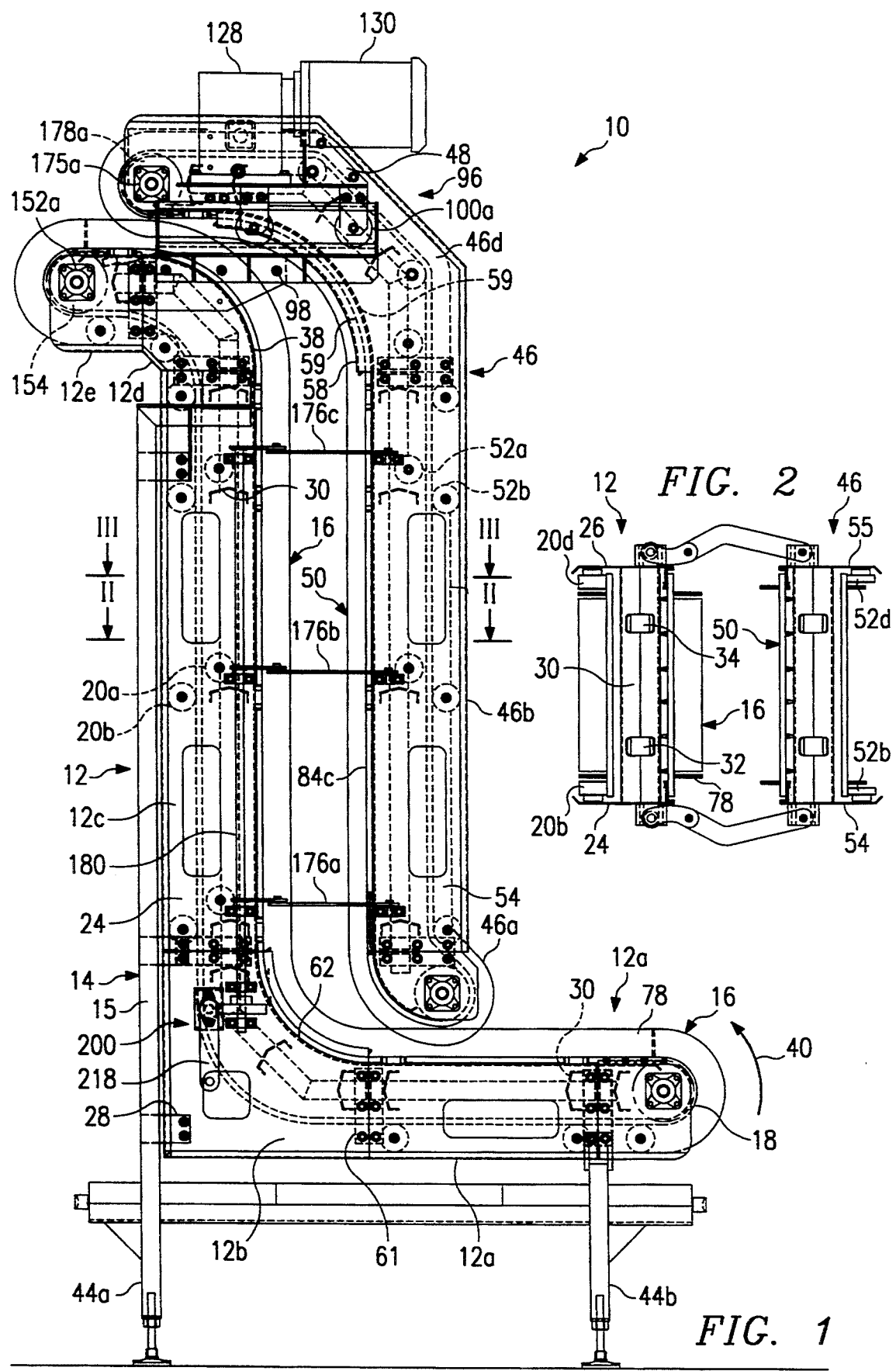
FIG. 1 is a side elevation of one preferred embodiment of the invention showing the secondary conveyor in its retracted position with portions of the primary conveyor omitted for clarity.
FIG. 2 is a cross-sectional view of the first and second conveyors taken as on line II—II of FIG. 1.

In the description to follow, like parts are designated throughout the specification and drawings with the same reference numerals, respectively. The drawings are not necessarily to scale, and in certain views portions have been exaggerated for clarity. For convenience of description, but not by way of limitation, the conveyor 10 is described herein as having a left side, facing the viewer as seen in FIG. 1, the "front" of the conveyor being that end seen in FIG. 6, and so on. Whereas the conveyor system is described in terms of its potential use for conveying particulate or packaged food products, it should be understood that it is also applicable for conveying finely divided particulate materials of various types, viscous liquids, and other loose or fluid substances.

With initial reference to FIG. 1, in accordance with one preferred embodiment, the conveyor system 10 includes a primary conveyor 12 supported upon frame 14, the primary conveyor having an endless belt structure 16, to be described, which is guided upon a plurality of rollers, of which rollers 20a and 20b are typical. The belt 16 is also guided upon rotatable sprockets, as indicated at 18, and low friction guide strips 38, 62, to be described. With added reference to FIG. 3, belt 16 is guided by rollers, such as rollers 20a, 20b, 20c and 20d. Rollers 20a, 20b, 20c, and 20d are rotatably mounted upon respective shafts 22a, 22b, 22c, 22d, shafts 22a, 22b being fixedly supported upon left side plate 24, and shafts 22c, 22d being mounted on right side plate 26. Side plates 24, 26 extend vertically along opposite sides of the frame 14 and are secured to vertical standards 15 (FIG. 1) of the frame, suitably by fastening members as shown at 28 in FIG. 1. The vertical, left and right side plates 24, 26 are mutually parallel and are interconnected, suitably by means of laterally extending channel members 30, as seen more clearly in FIGS. 2 and 3. As a part of frame 14, first and second, mutually spaced, vertical standards 32, 34 (FIG. 3) extend through respective openings formed in the channel members 30. The construction of conveyor systems having multiple rollers and guides for defining the path of movement of endless belts is known in the art and will not be described in detail herein. For example, such construction is shown in U.S. Pat No. 5,186,310, which is hereby incorporated by reference.

In the present, illustrative embodiment, and with reference to FIG. 1, the primary conveyor 12 includes a lower, horizontal entry portion 12a which is continuous with an upwardly curved portion, shown at 12b, which in turn is continuous with an elongated, substantially linear and vertically extending portion 12c. The conveyor 12 curves rearwardly, as seen at 12d, and continues as an exit portion 12e which extends generally horizontally and rearwardly, generally parallel with the lower, horizontal portion 12a. In operation, primary conveyor belt 16 is normally driven in the direction indicated at arrow 40. The primary conveyor 12 is thus fixedly positioned and supported by frame 14, having adjustable legs, e.g., legs 44a, 44b, adapted to rest on a supporting floor surface.

Figure 10:
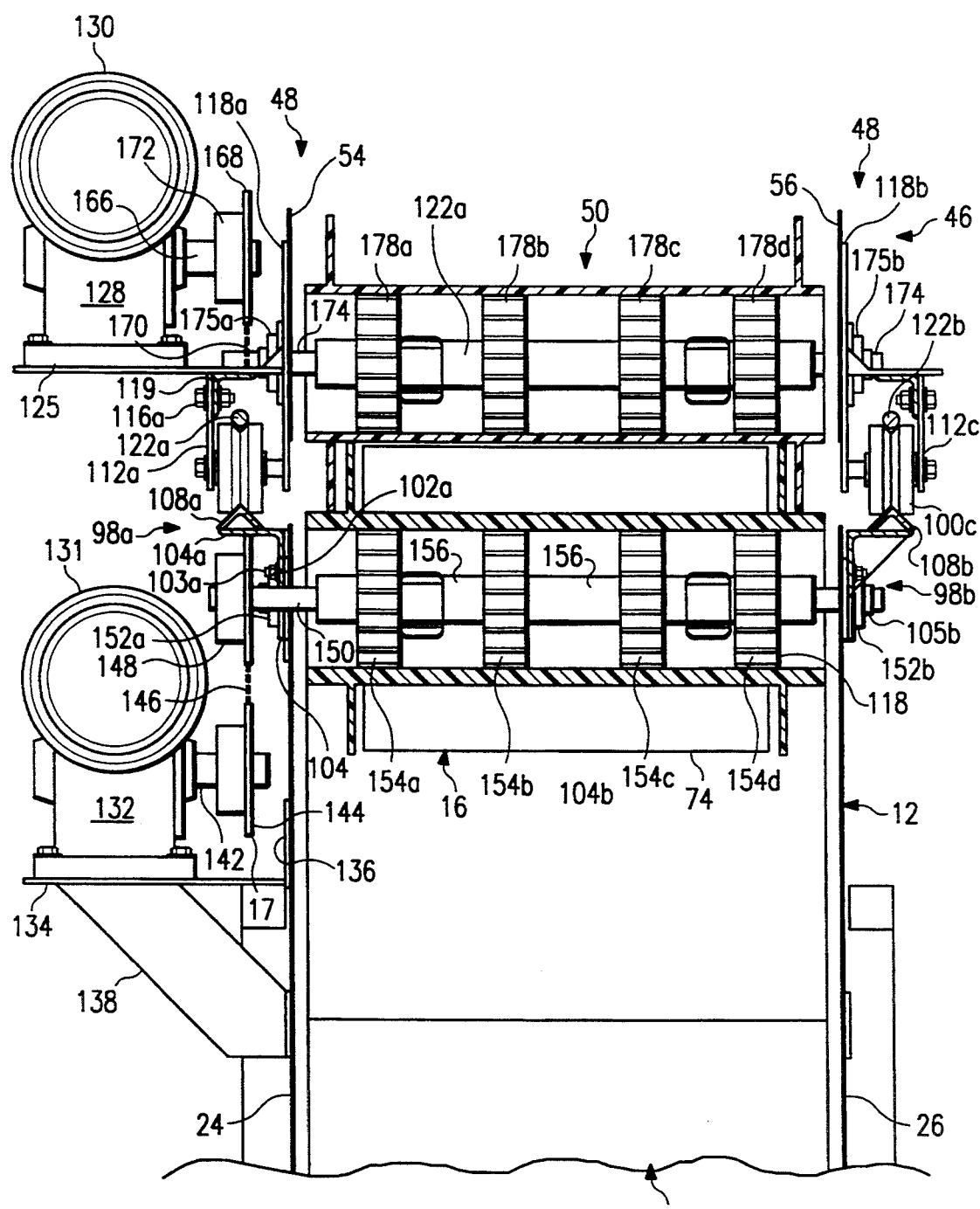
FIG. 10 is a sectional view taken as on line X—X of FIG. 4, with portions of the primary conveyor omitted for clarity and portions of the secondary conveyor belt omitted to show the drive sprockets employed for driving the secondary conveyor belt.

With continued primary reference to FIG. 1, the conveyor system 10 additionally includes an auxiliary or secondary conveyor 46 which is supported upon and, in the preferred embodiment, depends from a movable carriage, indicated generally at 48, for permitting lateral translation of the secondary conveyor 46 relative to the primary conveyor 12. The secondary conveyor 46 includes a second conveyor belt 50 which is supported in a configuration corresponding to and adapted to mate with belt 16. The terms "primary conveyor" and "secondary conveyor" are selected for convenience of description and are not intended to infer that the moveable, secondary conveyor 46 is non-operative or of secondary importance. Moreover, in the preferred embodiment and as will be described hereinbelow, both conveyor belts 16, 50 are independently driven, by drive motors 130, 131 (FIGS. 6, 10). Whereas the conveyors may be of various configurations so long as they include respective mutually confronting and conforming portions, as will be described in greater detail hereinbelow, in the present, illustrative embodiment, secondary conveyor 46, at its lower end, includes a forwardly curved, lower portion 46a, seen in FIGS. 1 and 4, and an elongated, generally linear and vertically extending portion 46b corresponding to and confronting the vertical portion 12c of primary conveyor 12. The secondary conveyor 46 includes a conveyor belt 50, to be described, which is guided by and supported upon guide rollers, four of which are shown, typically, at 52a, 52b, 52c, 52d (FIG. 3) guide rollers 52a and 52b being rotatably supported upon respective axles perpendicularly mounted on left side plate 54 of the secondary conveyor 46, in the same manner described above with respect to guide rollers 22a, 22b. Guide rollers 52c, 52d are rotatably supported on right side plate 56 (FIG. 3) of the secondary conveyor 46. Internal, parallel upright channel members or standards 57, 58 provide structural support for secondary conveyor 46 and are connected similarly to standards 32, 34, of the primary conveyor 12. The conveyors 12, 46 are suitably formed of interconnected modules, by bolted connections as shown at 61 in FIG. 1, for permitting lengthening, or shortening of the modules, or other modifications of linear or curved portions of the conveyors.

In the curved sections, e.g., 46a, 46b (FIG. 1) of the primary conveyor 12, and in curved sections of the secondary conveyor 46, a plurality of curved, longitudinally, oriented low friction guide bar structures, now to be described, are employed for guiding the respective belts 16, 50 around the curved portions, according to techniques and construction methods generally known in the art. Linear guide bar structures are preferably also provided in the linear portions 12c and 46b. For example, the secondary conveyor 46 includes a plurality of curved guide bar structures, indicated at 59, the guide bar structures having low friction strips 59a, facing generally rightwardly and upwardly as shown in FIG. 1, for slidingly contacting and guiding the secondary conveyor belt 50 along a curved path corresponding to that of the upper curved portion 46a of the secondary conveyor 50.

Figure 3:
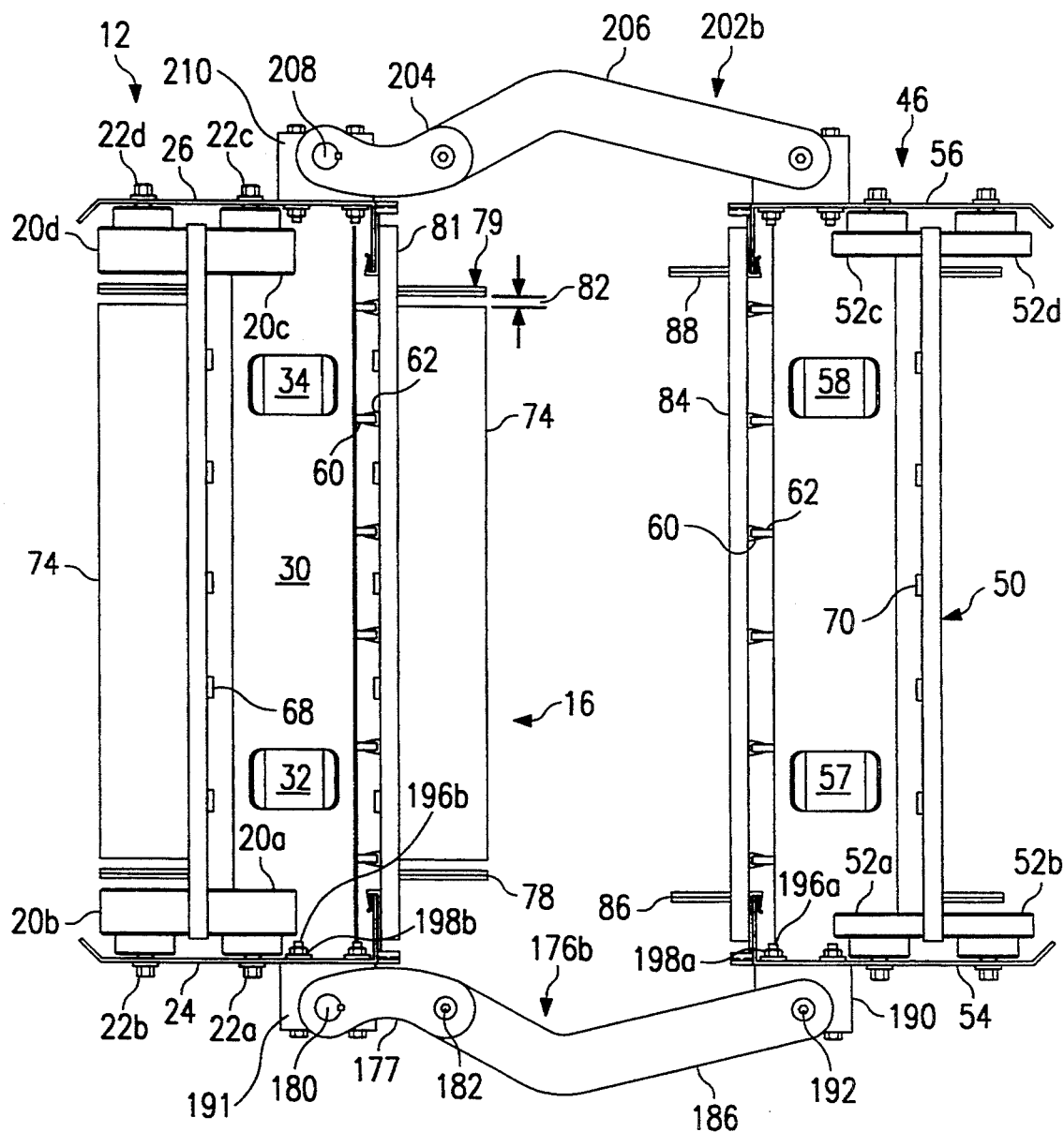
FIG. 3 is a cross-sectional view, similar to FIG. 2, taken as on line III—III of FIG. 1.

Referring to FIG. 3, the primary conveyor 12 includes a plurality of similar, vertical guide bar structures 60 also having low friction strips 62, of similar cross-sectional configurations. As seen in FIG. 3, the plurality of linear guide bars 60 are supported on cross members 30 and extend vertically, along the longitudinal section 12c (FIG. 1) of the primary conveyor 12. Guide bars 60 are capped with slotted bearing strips 62, of a low friction plastic material such as polyethylene or polyurethane, having head portions facing forwardly, i.e., toward conveyor belt 16. Similarly, linear guide bars 60 (FIG. 3) of secondary conveyor 46 are capped with respective low friction bearing strips 62 and are supported in parallel alignment with the linear, vertical portion 46b (FIG. 1) of the secondary conveyor 46, facing belt 50. The path of conveyor belts 16, 50, around the respective guide strips and between the guide rollers is seen more clearly in FIG. 7.

Referring additionally to FIG. 8, the configurations and mutual association of the two conveyor belts 16, 50 are shown in greater detail. Because of the rigid standards of sanitation entailed in the handling of food products and the like, the primary and secondary belts 16, 50 are preferably formed of a smooth surfaced polymer material such as polyurethane or polyethylene, the surfaces of which are readily cleaned by various cleaning solutions. Because such polymer materials are of substantially rigid construction, the endless belts 16, 50 must be constructed as respective series of pivotally interconnected links, as seen in FIG. 8. The articulated belts preferably include a series of inwardly projecting guide nodes 68, 70, which are engaged by respective sprocket wheels 18, 154, 178, as seen in FIGS. 1, 4, and 10, for maintaining the belts in linear alignment with the frames of the primary and secondary conveyors 12, 46. Primary belt 16 includes a plurality of flites 74, to be described hereinbelow in greater detail. Interconnected belt links, as seen, for example, at 76a, 76b, 76c (FIG. 8), are pivotally interconnected by means of laterally oriented hinge connections, as indicated at 77, utilizing laterally extending hinge rods connected in piano-hinge fashion. Mutually adjacent links of the secondary belt 50 are pivotally interconnected in the same manner described with respect to the primary belt 16.

In accordance with an important aspect of the present invention, the conveyor belts 16 and 50 are of particular configurations, now to be described. Primary conveyor belt 16 has mutually spaced, laterally extending flites 74, and left and right rows of overlapping side guards 78, 79 adapted to define respective chambers 80 (FIGS. 5,9) between the two belts when the secondary conveyor 46 is in its operable position, i.e., positioned adjacent the primary conveyor 12 as shown in FIGS. 4 and FIG. 5. The mechanism for translating the secondary conveyor 46 toward and away from the primary conveyor 12 will be described in greater detail hereinbelow. The primary conveyor belt 16 thus includes a plurality of mutually spaced, laterally extending flites 74, which project perpendicularly outwardly from the base portion 81 of the primary conveyor belt 16. In contrast with conventional conveyor belts having buckets or concave cleats, not shown, the flites 74 are of substantially planar configuration, for reasons which will become apparent from the description below of the operation of the system 10. Flites 74 are mutually spaced along belt 16 at intervals sufficient to accommodate the objects or packages to be conveyed. As seen in FIG. 8, the sideguards, such as sideguards 78a, 78b, and 78c, comprise outwardly projecting, longitudinally extending, mutually overlapping side plates. As seen more clearly in FIG. 3, the rows of side guards 78, 79 are positioned adjacent but spaced slightly outwardly from the flites 74, adjacent opposite ends thereof. The left and right series of side guards 78, 79 are spaced on either side of flites 74 by a distance 82 (FIG. 3) which is sufficient to prevent interference between the side guards 78, 79 and the flites 74. As seen more clearly in FIG. 8, the left and right rows 78, 79 of side guards extend along respective, mutually spaced loci parallel to the length of the conveyor belt 16. With continued reference to FIG. 8, the side guards 78, 79, of which side guards 78a, 78b, 78c are typical, suitably are formed integrally with respective belt links 76b belt structure 16. The side guards 78a, 78b, 78c, as typical, are slightly canted from the respective longitudinal loci extending parallel with respect to belt 16, whereby the trailing, overlapping portions thereof overlap the leading edge portions of the respective adjacent side guards immediately to the rear thereof.

In one embodiment, and as illustrated in the drawing, secondary belt 50 also includes rows 86, 88 of side guards of similar construction and having rearwardly extending, overlapping end portions, indicated at 88a, adequate to follow the path of movement of belt 50. Side guard rows 86, 88 are spaced outwardly from and extend parallel to side guard rows 78, 79. Accordingly, as the endless belts 16, 50 are conducted around curved portions of the conveyors 12, 46 (FIG. 1), the side guards of side guard rows 78, 79, 86, 88 overlap and slide forwardly or rearwardly over each other as the conveyor belts pass around the curved portions and as the adjacent articulated belt segments pivot as they pass through curved sections. However, the rearwardly extending, overlapping portions, e.g., portions 88a, project sufficiently rearwardly that, as one of the belts follows a convexly, curved portion, the mutually adjacent, overlapping side guards remain in overlapping relation to each other, whereby no gaps occur between adjacent pairs of side guards. Accordingly, the rows of side guards 78, 79 thereby comprise articulated, continuous side wall structures.

Because the secondary belt 50 does not include laterally extending flites or cleats, it thereby defines a continuous, central surface area, as indicated at 84 (FIG. 3), which, in the linear portions of the conveyor, is substantially planar. The first and second rows of side guards 86, 88 of secondary belt 50 project outwardly from the base surface 84 of the secondary belt 50 in the same manner described above with respect to the side guards 78, 79 of the primary belt 16, i.e., arrayed along respective loci parallel with the longitudinal axis of the secondary belt 50. As seen in FIG. 5, side guards 86, 88 are spaced laterally slightly outside or beyond the side guards 78, 79 of the primary belt 16 whereby, as may also be seen in FIG. 8, the side guards 78, 79 of the primary conveyor extend parallel with and between the side guards 86, 88 of the secondary conveyor.

Accordingly, as may be seen in FIG. 5, and more clearly in FIG. 9, a series of cavities or chambers 80 are defined between the primary and the secondary conveyor belts 16, 50 upon their being brought into mutually adjacent alignment. Chambers 80 are bounded on their respective side portions by the rows of side guards 78, 79 of the primary conveyor 16; bounded on their front and rear portions by respectively, adjacent flites 74; bounded on the inner, floor level by the base portion 81 of the primary conveyor 16, and on the outer boundary by the confronting surface 84 (FIG. 3) of the secondary conveyor belt 50. As will now be understood, since the flites 74 and rows of side guards 78, 79 are of substantially planar configuration, the cavities 80 defined therein are of substantially rectangular configuration, though their shape becomes modified slightly as the belts pass around curved sections. Because of this essentially rectangular configuration and because of the close mutual positions of adjacent chambers 80, which are mutually separated only by the widths of the respective intermediate flites 74, the chambers 80 occupy or fill substantially all the space defined between the two belts. Accordingly, substantially all of the space defined between the two belts is usable, i.e., available for receiving and carrying the product or substance to be conveyed, thereby providing efficiency of operation and high output.

As may be seen in FIG. 5, the side guards of rows 78, 79 project outwardly from base portion 81 of belt 16 by a distance substantially equal to the outward projection of flites 74, whereby the outer edges of the flites and side guards may be maintained in contact with the opposing face 84 of belt 50 of the secondary conveyor 46, thereby substantially sealing the closed chambers 80 formed between the two belts and minimizing any loss of particulate or viscous product from the cavities 80. The additional, outer rows of side guards 86, 88 optionally provided on secondary conveyor belt 50 serve further to minimize any seepage or leakage of finely divided or liquid material which may tend to flow around the outer edge portions of the rows of side guards 78, 79. It should be noted that, for prevention of such lateral leakage, it is not necessary that the flites 74 be in contacting or sealing relation with opposed conveyor surface 84, although close association therewith is preferred for moving the product efficiently. As may be seen in FIG. 5, although the laterally extending flites 74 and the side guards 78, 79 of the primary conveyor belt 16 are of substantially equal widths, the outer side guards 86, 88 of the secondary conveyor belt 50 may suitably be of somewhat lesser widths, to minimized interference and since dual rows of contacting side guards are not normally required to provide substantially sealed relation between the two belts 16, 50.

Referring to FIG. 4, the primary conveyor belt 16, at the forwardly extending, lower portion 12a of primary conveyor 12, is open for receiving the product to be conveyed, as seen also in FIG. 8. In operation, with the secondary conveyor 46 and belt 50 in the operative position as shown in FIG. 4, the product may be deposited manually, or by mechanized feeding means, not shown, onto the forwardly extending, lower portion of the primary conveyor belt 16, whereby the flites 74 carry the product rearwardly, or leftwardly as viewed in FIG. 4, and then upwardly and into engagement between the primary and secondary belts 12, 46, in the vertically oriented portion 12c of conveyor 12. Thus, the present embodiment of the conveyor system 10 constitutes a "vertical lift" conveyor.

Figure 11:
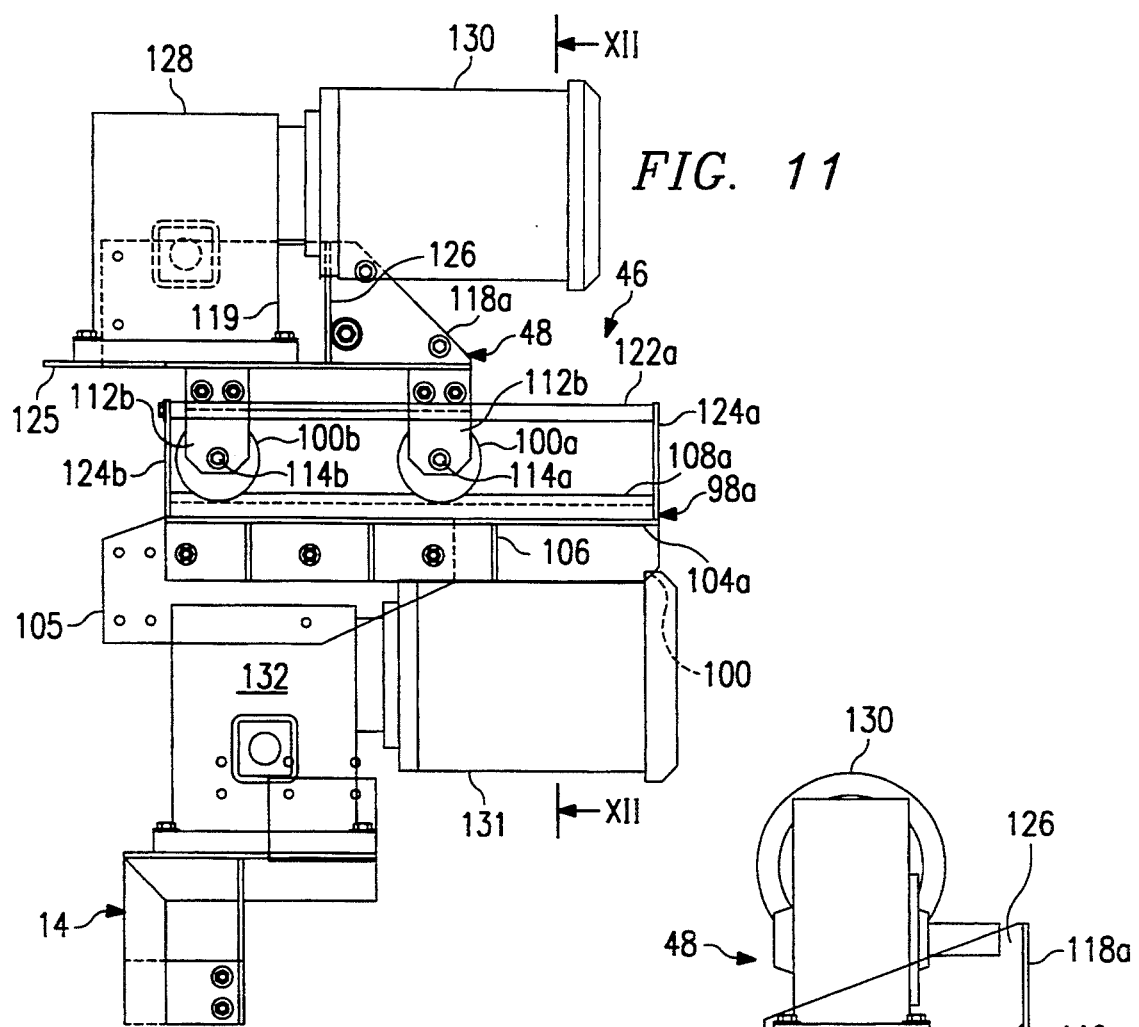
FIG. 11 is a fragmentary, side elevational representation of the track structure, secondary conveyor carriage, and conveyor drive motors.
Figure 12:
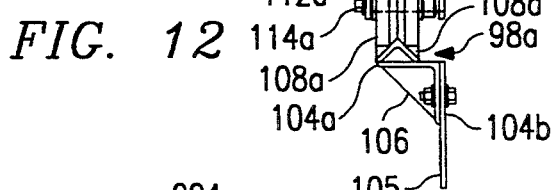
FIG. 12 is a cross-sectional, fragmentary view taken as on line XII—XII of FIG. 11.

With reference now to FIGS. 1, 10, and 11, the translating mechanism 96 (FIGS. 1, 11) and carriage structure 48 supporting the secondary conveyor 46 and permitting selective retraction and engagement of the secondary conveyor 46 relative to the primary conveyor 12 will now be described. As seen more clearly in FIG. 11, a generally horizontally extending, left track structure 98a (which corresponds with a right track structure 98b, FIG. 10) supports the carriage structure 48, the carriage structure 48 having first and second V-configured rollers 100a, 100b engaging the left track structure 98a. Similar, corresponding V-cut rollers, one of which is shown at 100c in FIG. 10, are rotatably mounted on the right side of the carriage structure 48 and are adapted to roll along right V-track structure 98b. Accordingly, translation of the carriage 48 and the depending, secondary conveyor 46 relative to primary conveyor 12 (FIGS. 1 and 4) is thereby permitted. As viewed in FIG. 1, the carriage 48 and secondary conveyor 46 are in the retracted or separated position, in which they are translated forwardly, i.e., rightwardly as viewed in FIG. 1, along track structure 98a, 98b (FIG. 10). As viewed in FIG. 4, the carriage 48 and secondary conveyor 46 are in the engaged or operable position, in which the carriage 48 and the secondary conveyor 46 have been translated rearwardly, or toward the primary conveyor 12, along track structures 98a, 98b (FIG. 10). With added reference to FIG. 12, left side portions of the translating carriage mechanism 48 are shown in greater detail, with portions of the conveyor structure removed for clarity. The left track structure 98a is supported upon a horizontally extending flange portion 104a of L-shaped stock, the vertical portion 104b thereof being affixed to vertical reinforcing plate 105, FIGS. 11, 12, which is bolted or otherwise affixed to a portion of the frame structure 14 of the primary conveyor 12. A plurality of vertical, laterally projecting gussets 106 extend perpendicularly between horizontal flange portion 104a and vertical flange portion 104b for reinforcement. A left, V-shaped track 108a is supported upon horizontal flange portion 104a, corresponding to right V-track 108b (FIG. 10). First and second rollers 100a, 100b are rotatably journaled, within respective downwardly projecting flanges 112a, 112b (FIG. 11), upon respective horizontal axles 114a, 114b which extend rightwardly from flanges 112a, 112b into bores formed within vertical supporting plate 118a, as seen in FIG. 12. The V-shaped guide wheels 100a, 100b are thus adapted to engage and roll along the V-shaped track 108a for permitting movement of the carriage 48 along the track 108a. For additional security, a safety bar 122a is supported above and in parallel alignment with the V-track 108a by means of left and right end plates 124a, 124b (FIG. 11), the safety bar 122a extending in alignment with and immediately above the V-configured support wheels 100a, 100b for preventing upward movement of the wheels and of the carriage structure 48 and thereby preventing derailment of the carriage structure from the track 108a. The carriage structure 48 includes corresponding -structure formed on the opposite, right side of the primary conveyor 12 (FIG. 10), in association with right V-track 108b and V-roller 100c (FIG. 10).

As may be seen more clearly in FIG. 12, the portions of the carriage structure 48 on the left side of primary conveyor 12 include a laterally extending floor plate 125 which is affixed to the vertical plate 118a and also to vertical flange member 112a. The floor 125 is also affixed to a diagonally extending, reinforcing gusset member 126, seen in FIGS. 11 and 12. The floor plate 126 supports a speed reducing gear box or transmission 128, of a gear ration appropriate for the particular application, an electric drive motor 130 such as a one horsepower motor, being drivingly connected to the gear box 128 for driving the secondary conveyor belt 50. The motor 130 and gear box 128 are thus mounted on and translated laterally with the secondary conveyor 46.

With primary reference to FIG. 10, the left and right vertical support plates 118a, 118b are a part of the translatable carriage structure 48 and are welded or otherwise affixed to the external surfaces of the upper portions of the left and right side guards 54, 56 of the secondary conveyor 46. The downwardly extending flanges 112a, 112c are interconnected and bolted, as seen at 116a, to horizontally extending L-shaped reinforcing strip 119 (FIG. 12), which is welded beneath outwardly extending, horizontal motor support floor 125 for structural support of the floor 125.

Referring to FIG. 11, the rollers 100a, 100b are thus in parallel, tandem alignment, their V-shaped peripheral surfaces engaging track 108a and adapted to roll forwardly and rearwardly on track 108a, as are the right rollers, e.g., roller 100c (FIG. 10), with respect to the right track 108b. Thus, the carriage structure 48, including left rollers 100a, 100b, and right rollers, as typified by roller 100c, flanges 112, and reinforcing plates 118a, 118b, serve to support the secondary conveyor 46 in alignment with the primary conveyor 12, yet permit translation of the secondary conveyor relative to the primary conveyor by the action of the rollers 100 riding along the respective tracks 108a, 108b. Rollers 100 are preferably of steel construction, and movement thereof along the tracks 108a, 108b is thus substantially free of frictional resistance.

With continued reference to FIG. 10, a primary belt drive motor 131, similar to secondary belt drive motor 130, is drivingly connected to a speed-reducing transmission 132 which is bolted to a horizontal motor support plate 134. (Motor 131 and transmission 132 are omitted from FIG. 1 for clarity.) Support plate 134 is affixed to vertical reinforcing plate 136 affixed to the left side guard 24 of primary conveyor 12 (FIG. 10), support plate 134 being supported and reinforced by a gusset member 138 connected diagonally beneath motor support plate 134. Transmission 132 has a rightwardly projecting drive shaft 142 having a drive pulley 144 non-rotatably mounted thereon. An endless drive chain 146 is engaged with pulley 144 and extends diagonally rearwardly and upwardly therefrom to engage a corresponding, driven pulley 148, which is rigidly mounted on the leftwardly projecting end portion of a primary belt drive shaft 150. Belt drive shaft 150 is rotatably journaled within first and second flange bearings 152a, 152b bolted to the left and right primary conveyor side guards 24, 26 adjacent their respective outer surfaces. The conveyor drive shaft 150 supports a plurality of annular drive sprockets 154a, 154b, 154c, 154d, non-rotatably mounted relative to the drive shaft 150 and mutually spaced thereon by spacers 156. Drive sprockets 154 have peripheral teeth for engaging and driving the inner surfaces of primary conveyor belt 16. Rotation of the drive sprockets 154 in a counter-clockwise direction, as viewed in FIG. 1, is thus effective to drive the primary conveyor belt 16 in the direction indicated by arrow 40 (FIG. 1).

Similarly, and with continued primary reference to FIG. 10, the secondary belt drive transmission 128, mounted on support floor 125, has a rightwardly extending drive shaft 166, having drive pulley 168 engaging drive chain 170 for driving the secondary conveyor belt 50. Chain 170 engages and drives a pulley 172 (shown in FIG. 4 but omitted from FIG. 10 for clarity) coaxially affixed to a secondary belt drive shaft 174, rotatably journaled within left and right flange bearings 175a, 175b mounted on the outer surfaces of left and right support plates 118a, 118b, respectively. In operation, drive motor 130 thereby drives the shaft 174 and associated drive sprockets 178a, 178b, 178c, 178d, which are non-rotatably mounted on the shaft 174. Drive sprockets 178 engage the secondary conveyor belt 50 for driving it in the direction indicated by arrow 83 (FIG. 8). As may be seen in FIG. 4, non-driven idler sprockets 179 are similarly rotatable mounted in the curved, lower section 46a of secondary conveyor 46. Drive motors 130, 131 and gear reducing transmissions 128, 132 are further seen, in side elevation, in FIG. 4.

It may now be understood that the conveyor belts 16, 50 are independently driven by drive motors 131, 130, respectively. The use of such dual drive motors and transmissions is preferred over a single drive motor in that, because each belt is independently driven, one does not tend to slide relative to or to exert frictional strain forces against the other if they are mutually engaged.

The actuating mechanism 200 for laterally translating the secondary conveyor 46 relative to the primary conveyor 12 will now be described, with initial reference to FIG. 1. Because the secondary conveyor 46 is hung from the carriage 48 and has no rigid support or connection to frame 14, it is advantageously interconnected to the primary conveyor 12 by means of a plurality of linkages 176a, 176b, 176c, now to be described, the linkages serving both to stabilize the secondary conveyor 46, preventing pendulous, swinging movement thereof, and also serving to transmit lateral forces through lever mechanisms 176a, b, c, for translating the secondary conveyor 46 toward and into contact with the primary conveyor 12, as shown in FIG. 4 and, conversely, for withdrawing the secondary conveyor 46 to its retracted position, as shown in FIGS. 1, 2 and 3. As seen in FIG. 3, linkage 176b, as typical, includes a crank arm 177 which is non-rotatably rotatably splined to a vertical shaft 180, seen also in FIG. 1, the distal end portion of crank arm 177 being pivotally connected, by a vertical pivot pin connector 182 to a dog-leg shaped follower arm 186. Vertical drive shaft 180 is rotatable within bearing assembly block 191. Upon vertical drive shaft 180 being rotated in a clockwise direction as viewed in FIG. 3, crank arm 177 is outwardly pivoted, in a clockwise direction relative to the primary conveyor 12, and the pivotally connected follower arm 186 is therefore drawn outwardly and leftwardly as viewed in the drawing, pulling the secondary conveyor 46 rearwardly, i.e., toward the primary conveyor 16. Referring still to FIG. 3, the opposite end portion of the follower arm 186 is pivotally connected to a bearing block 190, bolted to the secondary conveyor left side guard 54, connected to a vertical axle 192 which is axially rotatable within bearing assembly block 190. Because of the outwardly bent, dog-leg configuration of follower arm 186, the linkage crank arm 177 may be rotated through 180 degrees without interference between the follower arm 186 and the bearing block 191, mounted on the primary conveyor side guard 24. Bearing blocks 190, 191 are suitably mounted on the respective conveyors 46, 12 by means such as bolts 196a, 196b and nuts 198a, 198b. A corresponding, right linkage 202b, including crank arm 204 and dog-leg follower arm 206, is similarly mounted on and connected between the right sides of conveyors 12, 46, crank arm 204 being splined to a vertical drive shaft 208 which is rotatably journaled within bearing block 210 mounted upon right side guard 26. With additional reference to FIG. 15, linkage 202b is typical of right linkages 202a, 202b, 202c, corresponding to the left linkages 176a, 176b, 176c. When it is desired to retract or deploy the secondary conveyor 46 relative to the primary conveyor 12, the left and right vertical drive shafts 180, 208 must be rotated in opposite rotational directions. Thus, left drive shaft 180 is rotated in a clockwise direction, as viewed in FIG. 3, and right drive shaft 208 is rotated in a counterclockwise direction at the same rotational velocity, for translating secondary conveyor 46 forwardly toward and into adjacent operative association with primary conveyor 12, as seen in FIG. 1. Shafts 180, 208 may be driven by electrical motors (not shown), if desired, but in the present embodiment they are advantageously driven by means of a manually operated worm gear arrangement, now to be described. Referring additionally to FIG. 5, a threaded, left worm 214a is non-rotatably and coaxially affixed on a horizontal crank drive shaft 216, a crank 218, having a handle 219, being affixed to the distal end portion of the shaft 216 and extending radially therefrom for permitting convenient rotation of the shaft 216 by an operator.

Figure 13:
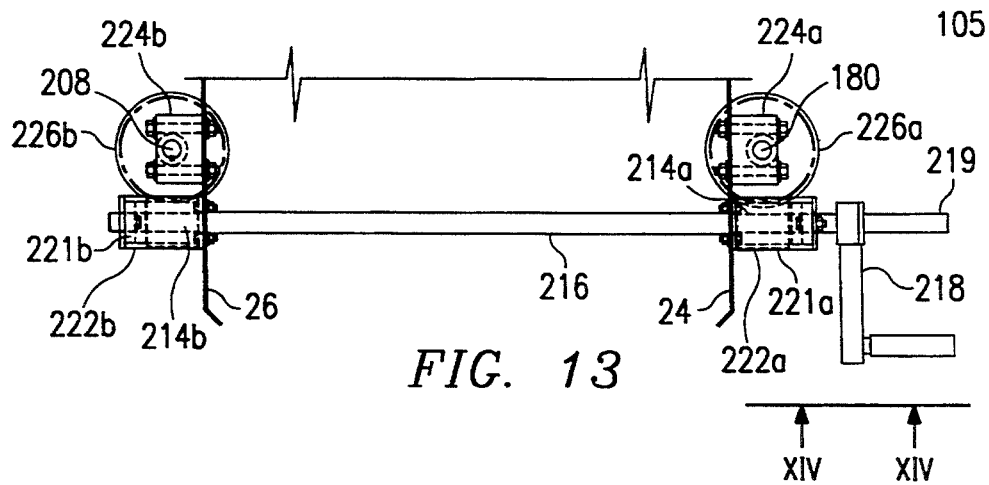
FIG. 13 is a fragmentary representation of the crank and worm drive gearing arrangement for translating the secondary conveyor.
Figures 14, 15:
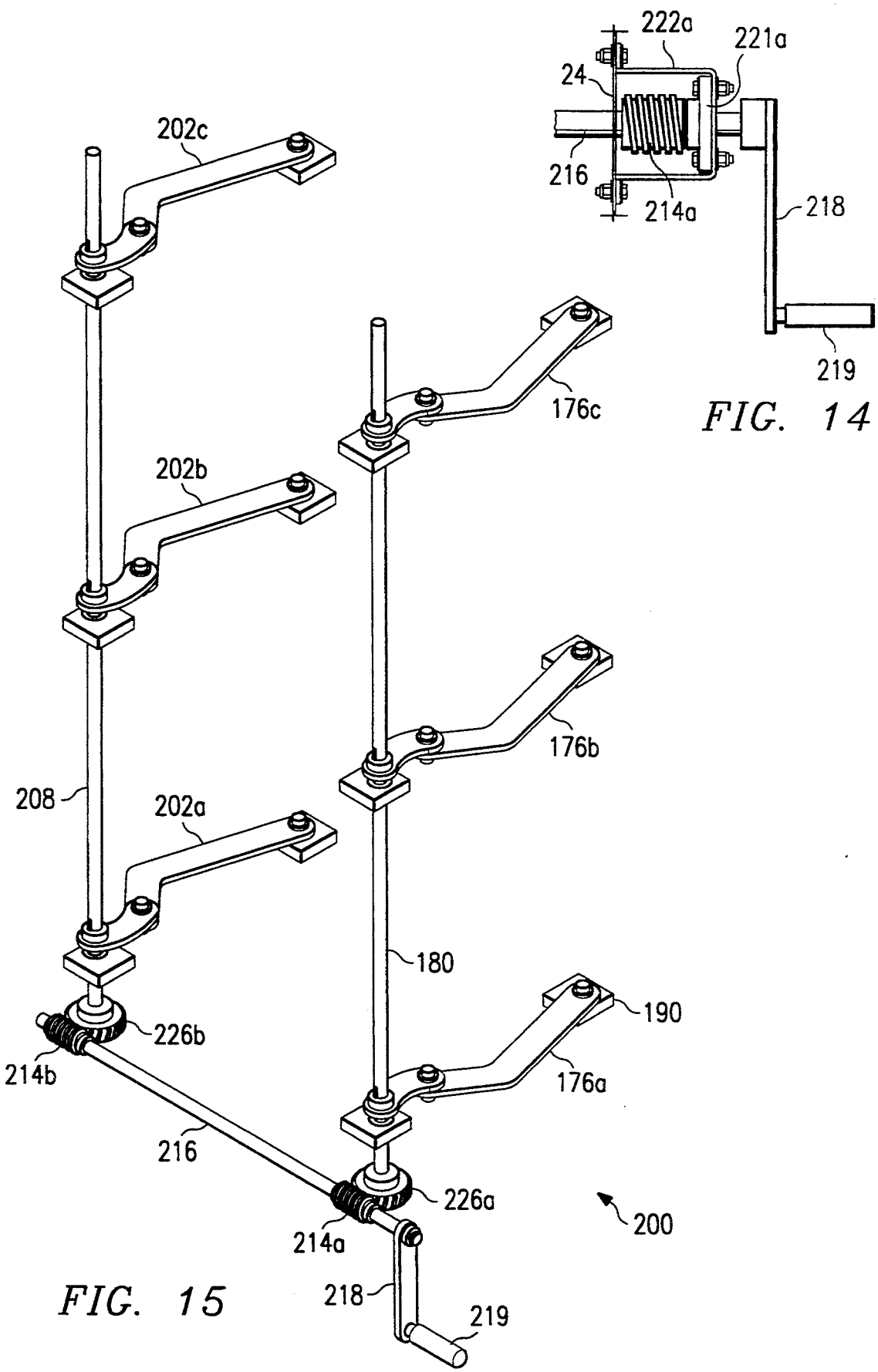
FIG. 14 is a fragmentary, end view of the crank and left worm drive, taken as on line XIV—XIV of FIG. 13.
FIG. 15 is a partially diagrammatic, perspective representation of portions of the actuating mechanism for selectively translating the secondary conveyor, with associated components omitted for clarity.

As may be seen in FIG. 13, the shaft 216 extends laterally through respective openings formed in the left and right side guards 24, 26 and is rotatably journaled within respective bearing structures 221a, 221b contained within bearing supports 222a, 222b, which are bolted or otherwise affixed to the left and right side guards 24, 26, respectively, as seen more clearly in FIG. 14.

Referring to FIG. 14, the rotatable, laterally extending crank shaft 216 is journaled within bearing structure 221a suitably supported by open bearing support housing 222a, which is bolted or otherwise secured to the side wall 24. The threaded portion, or worm 214a, is free to rotate within the housing 222a and, as seen in FIG. 13, is positioned in threaded engagement with annular worm gear 226a, which has peripheral spiral configured teeth adapted to engage the worm 214a. Worm gear 226a is coaxially mounted and non-rotatably splined to the vertical drive shaft 180. Similarly, a second, oppositely directed worm 214b is mounted on the opposite end of shaft 216 and is drivingly engaged with a second worm gear 226b which is splined to the right vertical drive shaft 208.

Referring now to FIG. 15, the engagement of the two worms 214a and 214b to the left and right worm gears 226a and 226b is shown in perspective, with the associated conveyor structures and conveyor belts omitted for clarity. Vertical shafts 180 and 208 are splined to the first and second worm gears 226a, 226b, respectively, which are driven by oppositely threaded worms 214a and 214b, whereby rotation of the crank 218 in a clockwise direction as viewed in the drawing, effects rotation of shaft 180 in a counter-clockwise direction and rotation of shaft 208 in a clockwise direction for separating the two conveyors 12, 46 (FIG. 1). Right linkages 202a, 202b, and 202c cooperate with the left linkages 176a, 176b, 176c for translating the secondary conveyor 46 (FIG. 1) laterally, while maintaining the parallel relation between the two conveyors 46, 12. Worm gears 226a, 226b are preferably of diameters sufficiently large to provide a desired mechanical advantage, minimizing frictional resistance to manual rotation of the crank 218.

In operation, in the present embodiment, the crank 218 is thus manually rotated in a clockwise rotational direction to separate the secondary conveyor 46 from the primary conveyor 12, as seen in FIG. 4. Referring to FIG. 3, as rotation of crank arm 177 (as typical) continues through 180 degrees, crank arm 177 becomes locked against the side guard 24, as may be seen in FIG. 5 with respect to the lowermost linkage 176a. Because the linkages 176a, 176b, 176c, 202a, 202b, 202c are operatively interconnected for simultaneous movement by crank shaft 216 and vertical shafts 180, 208, all of the linkages become locked, thereby maintaining the two conveyors 12, 46 constrained in close mutual alignment wherein the outer edge portions of the flites 74 and the side guards 78, 79 of the primary conveyor belt 16 preferably contact the outer surface 84 of the secondary conveyor belt 50. Rotation of the crank 218 in an opposite direction serves to translate the secondary conveyor 46 forwardly, along a horizontal path, whereby the linear portion 46b of the secondary conveyor separates from the linear portion 12c of the primary conveyor 12 but remains in parallel alignment therewith throughout the lateral displacement of the secondary conveyor 46.

It may thus be understood that the dual conveyor system 10 of the present invention provides a number of important technical advantages. A few of these advantageous features will now be summarized. First, because of the laterally translatable track-mounted secondary conveyor 46, separation of the primary and secondary conveyors 12, 46 permits convenient access to the interior surfaces of the conveyor belts 16 and 50, whereby the mutually adjacent surfaces thereof may be readily cleaned by means of pressure spray cleaning equipment or the like. Because of the use of the actuating mechanism 200 employing multiple, interconnected linkages 176a, 176b, 176c, and 202a, 202b, 202c, which are simultaneously and uniformly driven by the interconnected, first and second vertical drive shafts 180, 208, the secondary conveyor 46 is physically stabilized at all times, and during any of its relative positions. Thus, it may be quickly and conveniently translated to its operable position, by the use of the manually operated hand crank and worm drive mechanism, thereby permitting convenient and rapid access to the interior surfaces during cleaning operations. A further important technical advantage of the invention is provided by the combination of the actuating mechanism 200, including linkages 176a, 176b, 176c, 202a, 202b, 202c, and the reversely, oriented worm drives 214a, 214b, 226a, 226b, and the tracks 106a, 106b, and the track following carriage 48 (FIG. 10). Since the secondary conveyor 46 is not physically supported by the linkages 176, 202, but instead is movably supported upon the track structures 98a, 98b, the linkages are opposed in operation only by the resistance to rolling motion of the V-shaped pulleys 100. Thus, the linkages 176, 202, are not required to be of heavy, structural design as they would be if they supported the weight of the secondary conveyor 46, and they may thus be relatively light-weight, compact, and conveniently mounted alongside the conveyors 46, 12. From the above description, it will now be understood that lateral translation of the secondary conveyor may be readily and conveniently accomplished to separate the two conveyors 12, 46 and expose the interior surfaces of the two belts 16, 50 for cleaning and servicing.

The construction and mutual alignment of the conveyor belts 16, 50 is also of importance with respect to technical advantages provided in the conveyor system. Thus, the projecting Elites 74, and the dual rows 78, 79 of overlapping side guards oriented at right angles to the flites 74, as previously described, are effective to form the closed chambers 80 for safely and gently carrying various types of products and materials. Additionally, loose, fungible material, particulate material, viscous substances, deformable food products or food containers, and the like, all may be readily handled, since the chambers 80 are closed on all sides in the mutually confronting portions of the conveyor belts 16, 50 when the secondary conveyor belt 50 is in contact with the primary belt 16 of primary conveyor 12. The distal edge portions of flites 74 and side guards 78, 79 of the primary conveyor belt 16 thus contact the confronting surface 84 of the secondary conveyor belt 50 along the linear portion 12c of conveyor 12. Moreover, the overlapping side guards of side guard rows 78, 79, respectively mounted on the articulated belt links 76, prevent product waste and leakage. Because of this construction, no fixed side guard elements are required as in prior-art systems, since the product is safely and securely enclosed within the chambers 80 as it is conducted between the two conveyors 12, 46. The optional, supplementary side guards 86, 88 (FIG. 8) formed on the secondary conveyor belt 50 serve to further enhance the sealing relationship between the two conveyor belts 16, 50 for preventing spillage of the product. Additionally, because flites 74 are preferably of substantially planar, rather than curved configuration, food products or the like do not tend to lodge against and become affixed to the surfaces thereof.

It will now be seen that the conveyor system 10 of the present invention entails a number of technical advantages over prior-art systems and is advantageously used in a variety of applications, particularly with respect to the conveying of food products which must be carefully and gently handled to prevent damage or which entail stringent sanitation procedures and standards.

Various modifications and further embodiments of the system will become apparent to those skilled in the art, for adapting the system to particular applications and environments. For example, in the event that it is not necessary to provide a fully sealed relationship between the primary and secondary belts 16, 50, e.g., as in the case when relatively large products are to be carried which would not tend to escape from small gaps or openings in the chambers 80, it may not be necessary to include the outer side guards 86, 88 formed on the secondary conveyor 50. It also may not be required that the flites 74 and side guards 78, 79 be maintained in close contact with the confronting surface 84 of the secondary conveyor belt 50, in such an application. Whereas the conveyor system 10, in the present, illustrative embodiment, is of approximately Z-shaped configuration, it is also adapted for various other applications and configurations, having mutually confronting portions. In applications in which it is not necessary to separate the conveyors 12, 46 frequently for cleaning, it may in some applications be preferred to omit the worm drive actuating mechanism 200 and to interconnect the conveyors 12, 46 by means of fixed connecting devices, not shown. For example, in such an application, the two conveyors 12, 46 may be bolted immovably to each other and disassembled by removing the bolts. Thus, although the use of the track-mounted carriage, and the actuating mechanism are preferred for many applications, the mutually engaging belts 16, 50, having flites 74 and rows 78, 79 of side guards, provide important technical advantages in other applications in which the secondary conveyor 46 need not be translatably mounted. In such an application, the belts 16, 50 remain in a mutually adjacent relationship until the secondary conveyor 46 is disconnected from the primary conveyor 12. In still other applications, in which the chambers 80 are not required to be completely sealed, e.g., wherein the dimensions of the product to be conveyed are sufficiently large that spillage is not a problem, it may be desired to provide openings or perforations through the conveyor belts 16, 50 adjacent the chambers 80 for permitting circulation of air or other fluids to the product. For example, it may be desirable to apply a liquid to a food product, through such openings or orifices in the belt, as the product is being carried vertically between the primary and secondary conveyors 12, 46.

While only one embodiment of the apparatus, together with modifications thereof, has been described in detail herein and shown in the accompanying drawing, it will thus be evident that various further modifications are possible in the arrangement and construction of its components without departing from the scope of the invention.

What is claimed is:

1. A conveyor apparatus, comprising:
   a primary conveyor including a conveyor belt having a plurality of transversely extending, outwardly projecting flites each having a respective distal edge portion, and having a substantially linear portion;
   a secondary conveyor of a configuration corresponding to at least a portion of the primary conveyor and having a linear portion confronting the linear portion of the primary conveyor, the secondary conveyor having a conveyor belt; and,
   means for relatively translating the primary and secondary conveyors between a first orientation in which the linear portions of the primary and secondary conveyors are in mutually adjacent, parallel alignment, and wherein distal edge portions of the flites are adjacent to the conveyor belt in the confronting portion of the secondary conveyor, and a second orientation in which the linear portion of the secondary conveyor is spaced from and in substantially parallel alignment with the linear portion of the primary conveyor.

2. The apparatus of claim 1, comprising:
   means for linearly translating the secondary conveyor in a direction substantially perpendicular to the linear portion of the secondary conveyor.

3. The apparatus of claim 2, wherein the means for translating the secondary conveyor comprises at least one linear track mounted on the primary conveyor and extending along an axis substantially perpendicular to the linear portion of the secondary conveyor.

4. The apparatus of claim 3, wherein the means for translating the secondary conveyor further comprises a carriage means having guide wheel means for engaging at least one track.

5. The apparatus of claim 1, wherein the means for relatively translating the primary and secondary conveyors comprises a drive shaft axially rotatably mounted on one of the linear portions of the conveyors and extending parallel thereto, and linkage means connected between the drive shaft and the other conveyor means, the drive shaft being drivingly connected to the linkage means.

6. The apparatus of claim 5, the linkage means having first and secondary, pivotally connected linkage arms, the first lever arm having a proximal end portion pivotally connected to the drive shaft and having a distal portion fixedly connected to the second lever arm.

7. The apparatus of claim 6, further comprising a worm gear drive mechanism engaged with the drive shaft.

8. The apparatus of claim 7, wherein the worm drive mechanism includes an axle having threads for engaging a worm gear fixedly and coaxially mounted on the drive shaft and having a handle, whereby the worm gear drive mechanism comprises means for transmitting rotational forces to the drive shaft.

9. The apparatus of claim 1, wherein the flites are of substantially planar configuration, projecting from the primary conveyor belt to the secondary conveyor belt in the linear portions of the primary and secondary conveyors.

10. The apparatus of claim 9, further comprising first and second pluralities of side guards, projecting outwardly from the primary conveyor and spaced on opposite sides of the flites.

11. The apparatus of claim 9, further comprising first and second pluralities of side guards projecting outwardly from the secondary conveyor, and spaced on opposite sides of the flites of the primary conveyor.

12. The apparatus of claim 11, wherein the flites and side guards of the primary conveyor comprise means for defining a plurality of substantially rectangular cavities between the confronting portions of the primary and secondary conveyors, upon the conveyors being in their mutually adjacent orientation.

13. A conveyor apparatus, comprising:

a primary conveyor having a first endless belt structure having an outer surface and a plurality of laterally extending flites projecting outwardly from the outer surface and each having respective distal edge portions spaced from and substantially parallel to the outer surface, the first endless belt structure having a portion extending in a first planar region;

a secondary conveyor having a second endless belt structure having a substantially planar portion;

means for positioning the primary and secondary conveyors in a mutually adjacent orientation in which the substantially planar portion of the second endless belt structure extends along a second planar region parallel to and spaced from the first planar region and wherein the portion of the second endless belt structure within the second planar region has an outer surface confronting the flites of the first endless belt structure and wherein the distal edge portions of the flites extend parallel and adjacent to said surface; and, means for translating the primary and secondary conveyors relative to each other to a position in which the planar region of the second endless belt is positioned in a third planar region parallel to and extending between the first and second planar regions.

* * * * *